Oct. 9, 1934.  A. A. PONSONBY  1,976,512

MOTOR CONTROL SYSTEM

Filed June 17, 1932

WITNESSES:

INVENTOR
Amos A. Ponsonby.
ATTORNEY

Patented Oct. 9, 1934

1,976,512

UNITED STATES PATENT OFFICE 1,976,512

MOTOR CONTROL SYSTEM

Amos A. Ponsonby, Forest Hills, Pa., assignor to Westinghouse Electric & Manufacturing Company, East Pittsburgh, Pa., a corporation of Pennsylvania Application June 17, 1932, Serial No. 617,806

8 Claims. (Cl. 172—179)

My invention relates, generally, to motor control systems and more particularly to systems for controlling the operation of motor driven vehicles as, for example, mining locomotives.

It is the usual practice, in motor control systems, to provide a no-voltage relay in order to protect the motors and also the operators against injury in the event that the power is interrupted and then restored while the motors are still connected to the power source. The no-voltage relay functions to disconnect the motors from the power source upon a reduction of the voltage of the power source. However, the use of a no-voltage relay increases the cost and the weight of the control equipment required for controlling the operation of a mining locomotive or other electric vehicle. It also increases the space required for mounting the equipment on the vehicle.

An object of my invention, generally stated, is to provide a motor control system which shall be simple and efficient in operation and which may be readily and economically manufactured and installed.

A more specific object of my invention is to provide for utilizing the line switch in a motor control system to protect the motors and the operator against injury resulting from the failure and the restoration of the power supply.

Another object of my invention is to provide for utilizing the main motor circuits as control circuits for the control equipment in a motor control system.

Other objects of my invention will either be explained fully hereinafter or will be apparent to those skilled in the art.

For a fuller understanding of the nature and scope of my invention, reference may be had to the following detailed description, taken in conjunction with the accompanying drawing, in which.

Figure 1:
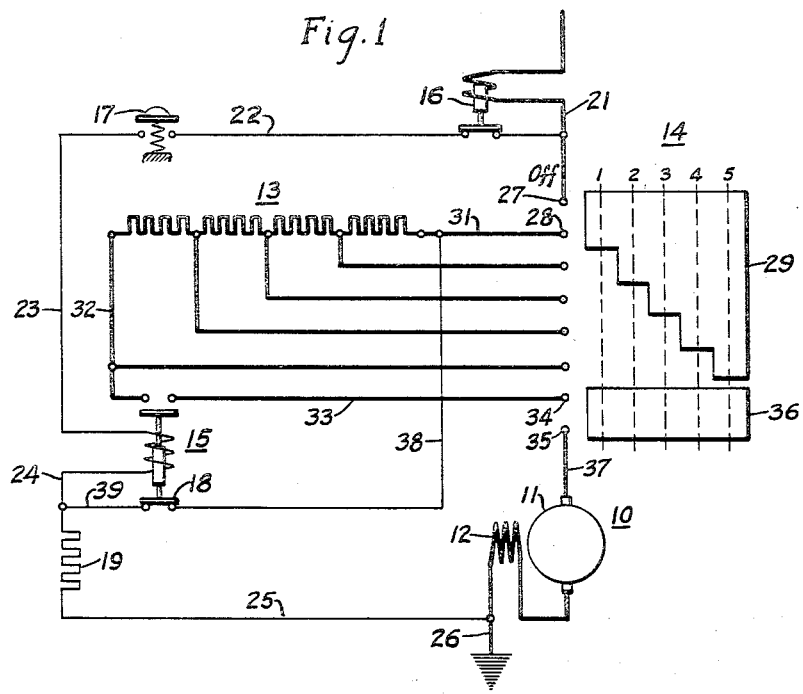
Figure 1 is a diagrammatic view of a control system embodying my invention.

Referring to the drawing, and in particular to Fig. 1, the reference numeral 10 designates, generally, a motor of the series type having an armature winding 11 and a series field winding 12. Electrical power for operating the motor 10 may be obtained from an overhead trolley conductor, or other suitable source, not shown.

In accordance with the usual practice, the speed of the motor 10 may be controlled by means of a plurality of resistor sections 13 which are connected in series-circuit relation with the motor and which may be shunted in successive steps by a manually operable drum controller 14.

An electricaly operated line switch 15 is disposed to connect the motor to the power source when the actuating coil of the switch is energized. As shown, the energization of the actuating coil of the switch 15 is controlled by an overload relay 16 of the usual type, and a foot-operated safety switch 17, which may be so located in the locomotive that the operator must be in the proper operating position on the locomotive before it can be started. However, the foot-operated switch 17 is not essential for the correct functioning of my control scheme and it may be omitted if desired.

In order that the line switch 15 may be utilized to afford no-voltage protection in case the power is interrupted and then restored while the control drum 14 is in any of the "on" positions, provision is made for preventing the line switch from being reclosed, after it has opened, until the control drum 14 is actuated to the "off" position.

As shown in Fig. 1, a shunt circuit around the actuating coil of the switch 15 is established through the controller 14 and an interlock 18, on the switch 15, thereby preventing the switch from being closed while the control drum is in the "on" position. A resistor 19 is provided for limiting the current flowing through the shunt circuit.

Assuming that it is desired to connect the motor 10 to the power source, the foot-operated switch 17 may be actuated to the closed position to energize the actuating coil of the switch 15. The energizing circuit through the coil of the switch may be traced from the power conductor 21 through the contact members of the overload relay 16, conductor 22, the switch 17, conductor 23, the coil of the switch 15, conductor 24, resistor 19, and conductor 25 to the grounded conductor 26.

The drum controller 14 may then be actuated to position "1", thereby completing a circuit through the motor 10, which may be traced from the power conductor 21 through contact members 27 and 28—bridged by a contact segment 29—conductor 31, the resistor 13, conductor 32, the line switch 15, conductor 33, contact members 34 and 35—bridged by a contact segment 36—conductor 37, the armature 11, and the series-field winding 12 to the grounded conductor 26.

The motor may be accelerated in the usual manner by actuating the control drum 14 to positions "2", "3", "4", and "5" in successive relation to shunt the resistor sections 13 step-by-step, thereby increasing the voltage applied to the motor.

If the circuit through the actuating coil of the switch 15 is interrupted by the opening of the overload relay 16, or the releasing of the foot-operated switch 17, or in case the voltage of the power source falls below a predetermined value, the line switch 15 will drop to its lowermost position, thereby disconnecting the motor 10 from the power source. When the switch 15 drops to its lowermost position a shunt circuit is established around its actuating coil which prevents the switch from being reclosed until the control drum 14 is actuated to its off position. The shunt circuit may be traced from the power conductor 21, through contact members 27 and 28—bridged by contact segment 29—conductors 31 and 38, the interlock 18, conductor 39, the resistor 19, and conductor 25 to the grounded conductor 26.

In this manner the motor 10 is prevented from being reconnected to the power source, upon the restoring of normal voltage on the power system, until after the drum 14 is first actuated to the "off" position and then advanced in the normal manner, thereby protecting the motor 10 against the application of an excessive voltage, since the resistor 13 is connected in the motor circuit. The operator and other persons who may be around the locomotive are also protected from any injury which might result from the sudden starting of the locomotive as it is necessary for the operator to be in a position to operate the controller 14 before the locomotive can be started. When the switch 17 is supplied as an additional safety feature, it is also necessary for the operator to keep the switch closed by means of his foot while operating the locomotive.

Figure 2:
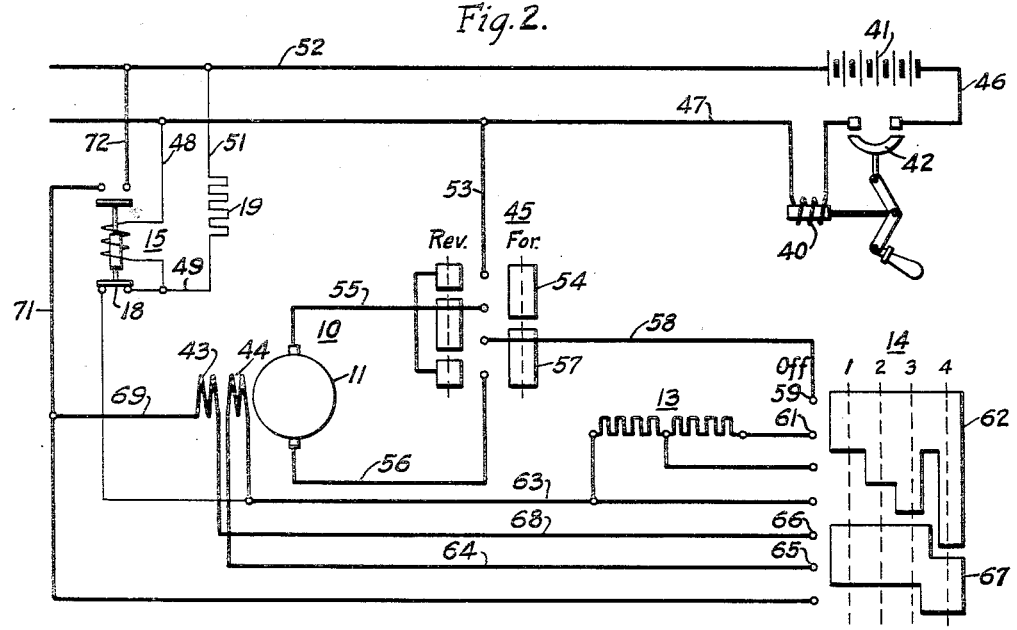
Fig. 2 is a diagrammatic view of a modification of my invention illustrating its application to a locomotive of the storage battery type.

In the modification of my invention shown in Fig. 2, power for operating the motor 10 may be obtained from a storage battery 41. A circuit breaker 42 having an overload trip device 40 is provided for disconnecting the motor from the battery in case of an overload on the motor. In accordance with a well known practice, the field winding of the motor 10 is divided into two sections, 43 and 44, which may be connected in either series or parallel circuit relation in order to control the speed of the motor. The resistor 13, which may be shunted by the drum controller 14 is also utilized to control the motor speed.

In order that the line switch 15, which disconnects the motor from one terminal of the battery 41, may be utilized to protect the motor and the operator from injury, provision is made for shunting the actuating coil of the switch 15 in a manner similar to that shown in Fig. 1, thereby making it necessary for the operator to actuate the control drum 14 to the "off" position before the line switch can be closed. In this instance the main motor circuits are utilized as control circuits for controlling the operation of the line switch 15, thereby simplifying the wiring system of the locomotive.

Assuming that the reversing switch 45 is in the "forward" position and that the control drum 14 is in the "off" position, the line switch 15 may be closed by closing the circuit breaker 42. The energizing circuit for the actuating coil of the switch 15 extends from one terminal of the battery 41 through conductor 46, the circuit breaker 42, conductors 47 and 48, the coil of the switch 15, conductor 49, the resistor 19 and conductors 51 and 52 to the other terminal of the battery 41.

The motor 10 may then be started by actuating the control drum 14 to position "1", thereby energizing the motor windings through a circuit which may be traced from one terminal of the battery 41 through conductor 46, circuit breaker 42, conductors 47 and 53, contact segment 54, conductor 55, armature 11, conductor 56, contact segment 57, conductor 58, contact members 59 and 61—bridged by the contact segment 62—the resistor 13, conductor 63, the field winding 44, conductor 64, contact members 65 and 66—bridged by contact segment 67, conductor 68, the field winding 43, conductors 69 and 71, the line switch 15 and conductors 72 and 52 to the other terminal of the battery 41.

The motor 10 may be accelerated in the usual manner by actuating the control drum 14 to positions "2" and "3" to shunt the resistor 13 in successive steps. The speed of the motor may be increased still further by actuating the controller 14 to position 4 to connect the field windings 43 and 44 in parallel-circuit relation.

In case the circuit breaker 42 is opened because of an overload, or the power should fail for any other reason, the line switch 15 will immediately open and it is necessary for the drum 14 to be actuated to the "off" position before the line switch can be reclosed to reconnect the motor 10 to the power source.

When the line switch 15 drops to its lowermost position a shunt circuit is established through the interlock 18, the control drum 14 and the armature of the motor which prevents the actuating coil of the switch 15 from being energized by the reclosing of the circuit breaker 42 and the energization of the power conductors 47 and 52 while the control drum 14 is in any one of its operating positions. The shunt circuit around the actuating coil of the switch 15 may be traced from one terminal of the battery 41 through conductor 46, the circuit breaker 42, conductors 47 and 53, contact segment 54, conductor 55, the armature 11, conductor 56, contact segment 57, conductor 58, contact segment 62 of the drum 14, conductor 63, the interlock 18, conductor 49, resistor 19, and conductors 51 and 52 to the other terminal of the battery 41.

In this manner, provision is made for utilizing the switch 15 both as a line switch and as a protective relay for protecting the motor against injury resulting from the application of full line voltage to the motor when it is not rotating. By actuating the drum 14 to the "off" position to permit the line switch 15 to be closed, the resistor 13 is inserted in the motor circuit thereby reducing the voltage applied to the motor.

From the foregoing description it is evident that I have provided a simple and economical means of protecting both the electrical equipment and the operators of electric vehicles, or other apparatus driven by electric motors, from injury resulting from the failure and the restoration of the power supply.

I do not desire to be restricted to the particular form or arrangement of parts herein shown and described, since it is evident that they may be changed and modified without departing from the spirit and scope of my invention as defined in the appended claims.

I claim as my invention:

1. In a motor control system, in combination, a motor, a source of power for the motor, switching means for connecting the motor to the power source, a resistor for controlling the speed of the motor, a controller for shunting the resistor, and interlocking means mechanically actuated by said switching means for preventing the motor from being connected to the power source until after the controller has been actuated to a predetermined position.

2. In a motor control system, in combination, a motor, a source of power for the motor, switching means for connecting the motor to the power source, a resistor for controlling the motor current, a controller for shunting the resistor to control the speed of the motor, and interlocking means mechanically actuated by the switching means for preventing the motor from being connected to the power source without said resistor being connected in the motor circuit.

3. In a motor control system, in combination, a motor, a source of power for the motor, switching means for connecting the motor to the power source, a resistor for controlling the motor current, a controller for shunting the resistor to control the speed of the motor, and interlocking means mechanically actuated by the switching means for preventing it from being actuated to connect the motor to the power source without said controller being in a predetermined position.

4. In a motor control system, in combination, a motor, a source of power for the motor, a switch for connecting the motor to the power source, a resistor for controlling the motor current, a controller for shunting the resistor to control the speed of the motor, and an interlock mechanically actuated by said switch disposed to prevent the switch from being actuated to connect the motor to the power source without said resistor being connected in the motor circuit.

5. In a motor control system, in combination, a motor, a source of power for the motor, a switch for connecting the motor to the power source, a controller for controlling the speed of the motor, an actuating coil for operating said switch, and interlocking means mechanically actuated by said switch and cooperating with said controller for preventing said actuating coil from being energized until after the controller has been actuated to a predetermined position.

6. In a motor control system, in combination, a motor, a source of power for the motor, a switch for connecting the motor to the power source, a resistor for controlling the motor current, a controller for shunting the resistor to control the speed of the motor, an actuating coil for operating said switch, and an interlock mechanically actuated by said switch and disposed to cooperate with said controller to prevent said coil from being energized until after the controller has been actuated to a predetermined position.

7. In a motor control system, in combination, a motor, a source of power for the motor, switching means for connecting the motor to the power source, a resistor for controlling the motor current, a controller for shunting the resistor to control the speed of the motor, and interlocking means mechanically actuated by said switching means and disposed to cooperate with said controller through the motor circuit to prevent the switching means from being operated without said resistor being connected in the motor circuit.

8. In a motor control system, in combination, a motor, a source of power for the motor, switching means for connecting the motor to the power source, a resistor for controlling the motor current, a controller for shunting the resistor to control the speed of the motor, and an interlock mechanically actuated by said switching means and disposed to cooperate with said controller through the motor circuit when said switching means is in a deenergized position to prevent the switching means from being energized until after the controller has been actuated to a predetermined position.

AMOS A. PONSONBY.